J. G. BLUNT.
LOCOMOTIVE TRAILING TRUCK.
APPLICATION FILED DEC. 30, 1914.
1,133,427.
Patented Mar. 30, 1915.
5 SHEETS—SHEET 3.
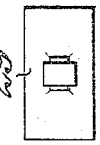
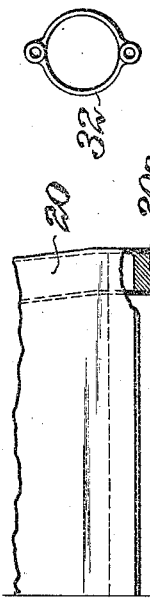
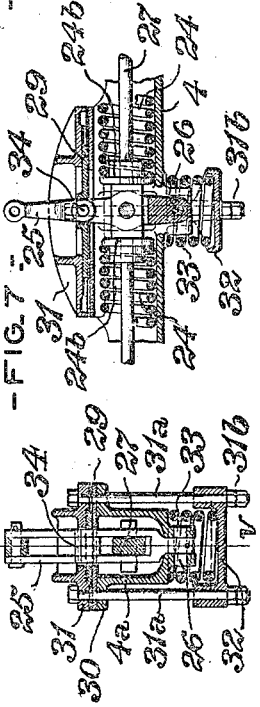
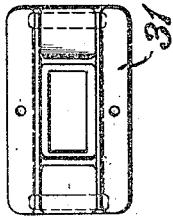
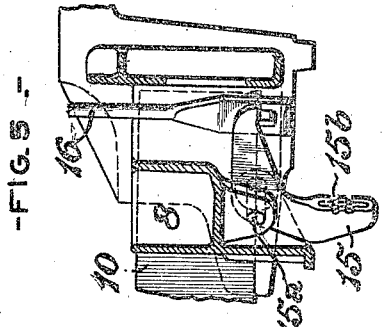
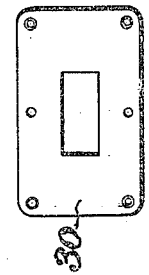
WITNESSES:
Edward Wright
S. R. Bell
INVENTOR.
James G. Blunt
by J. Snowden Bell
Atty.

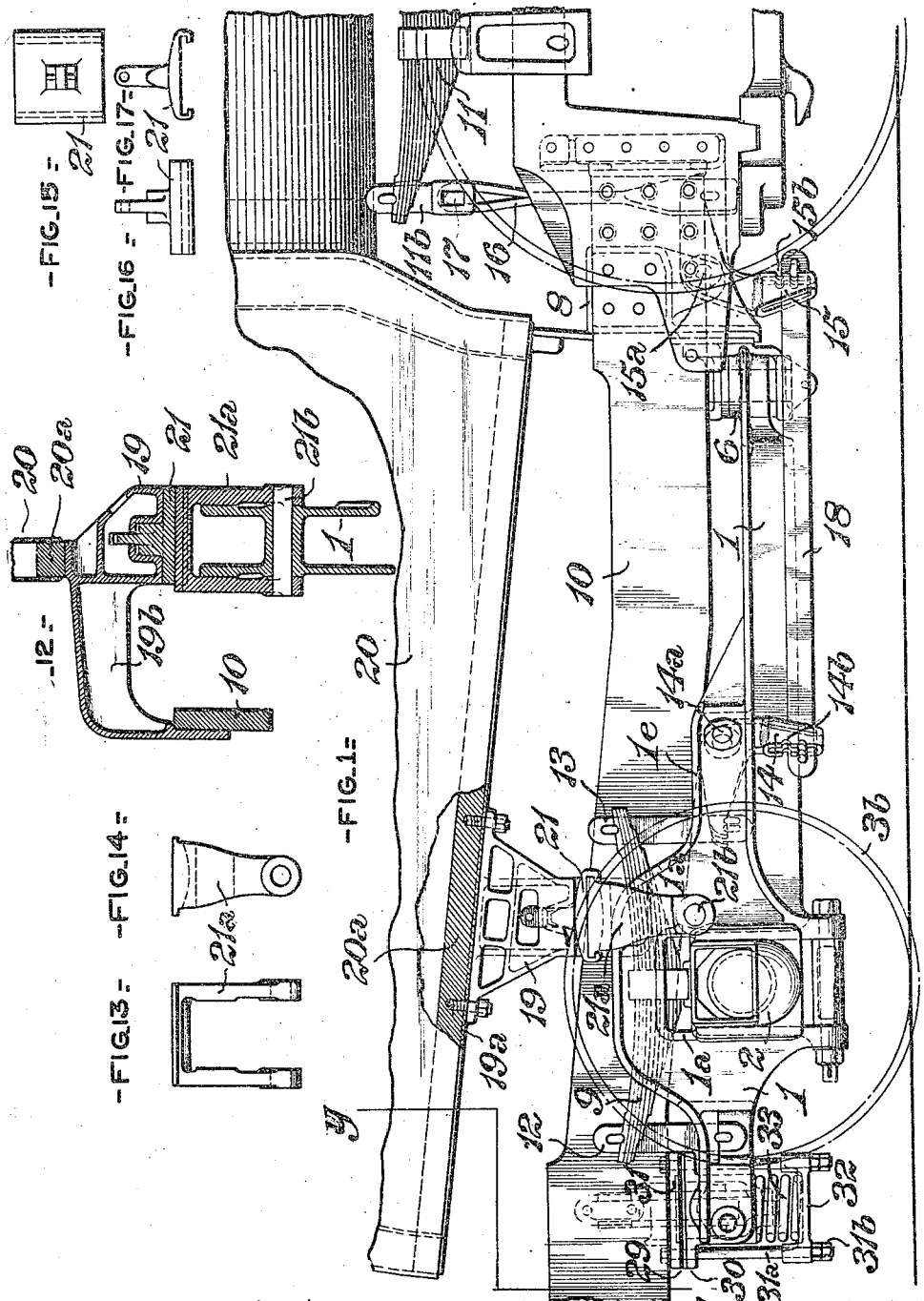

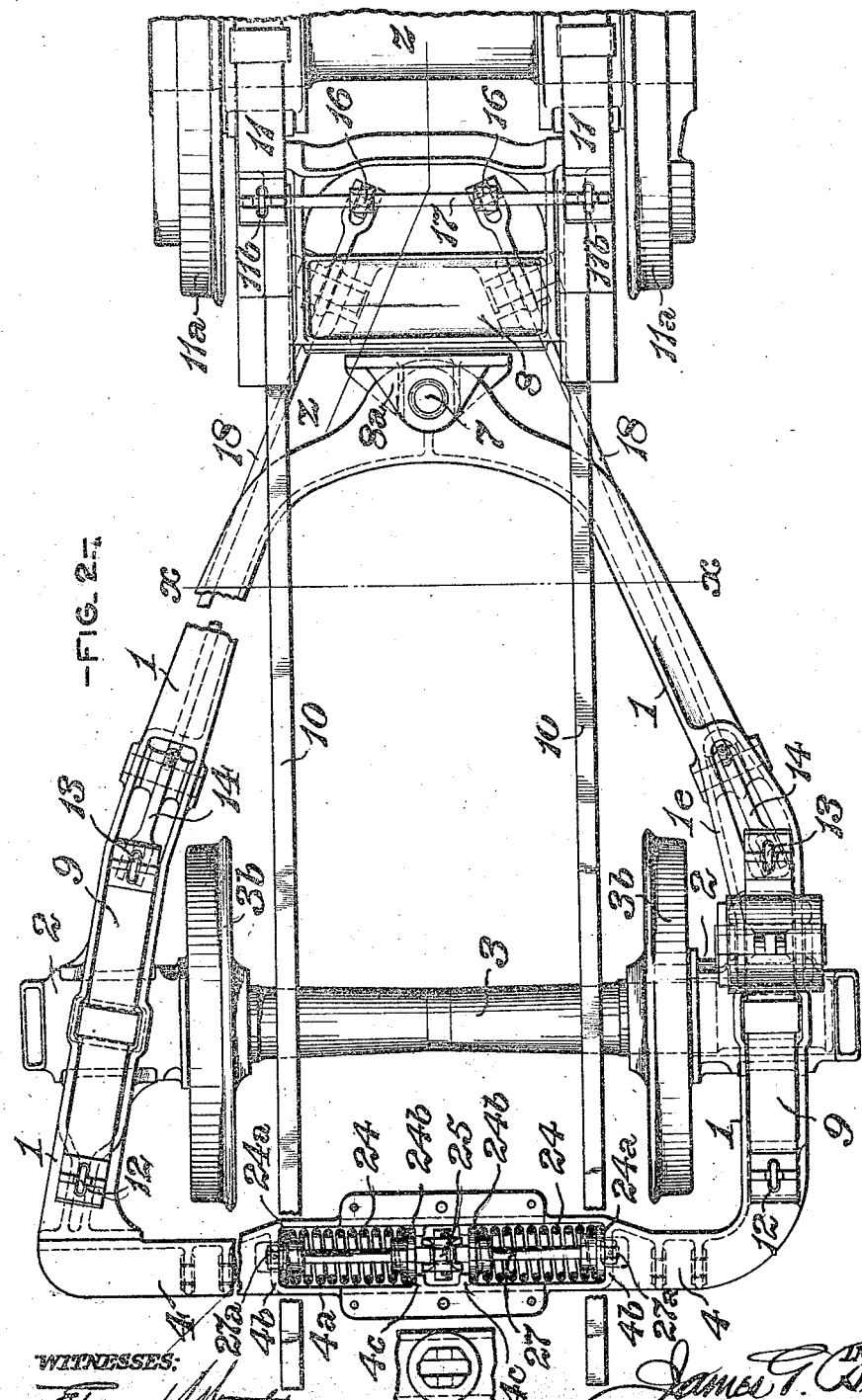

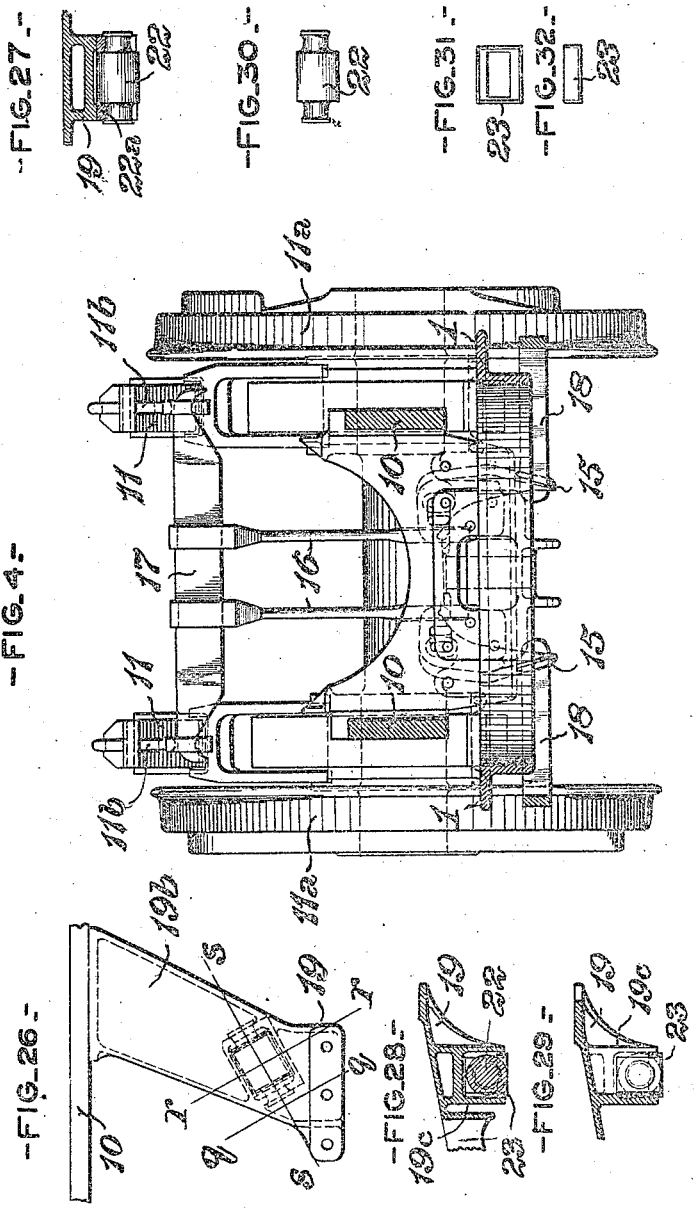

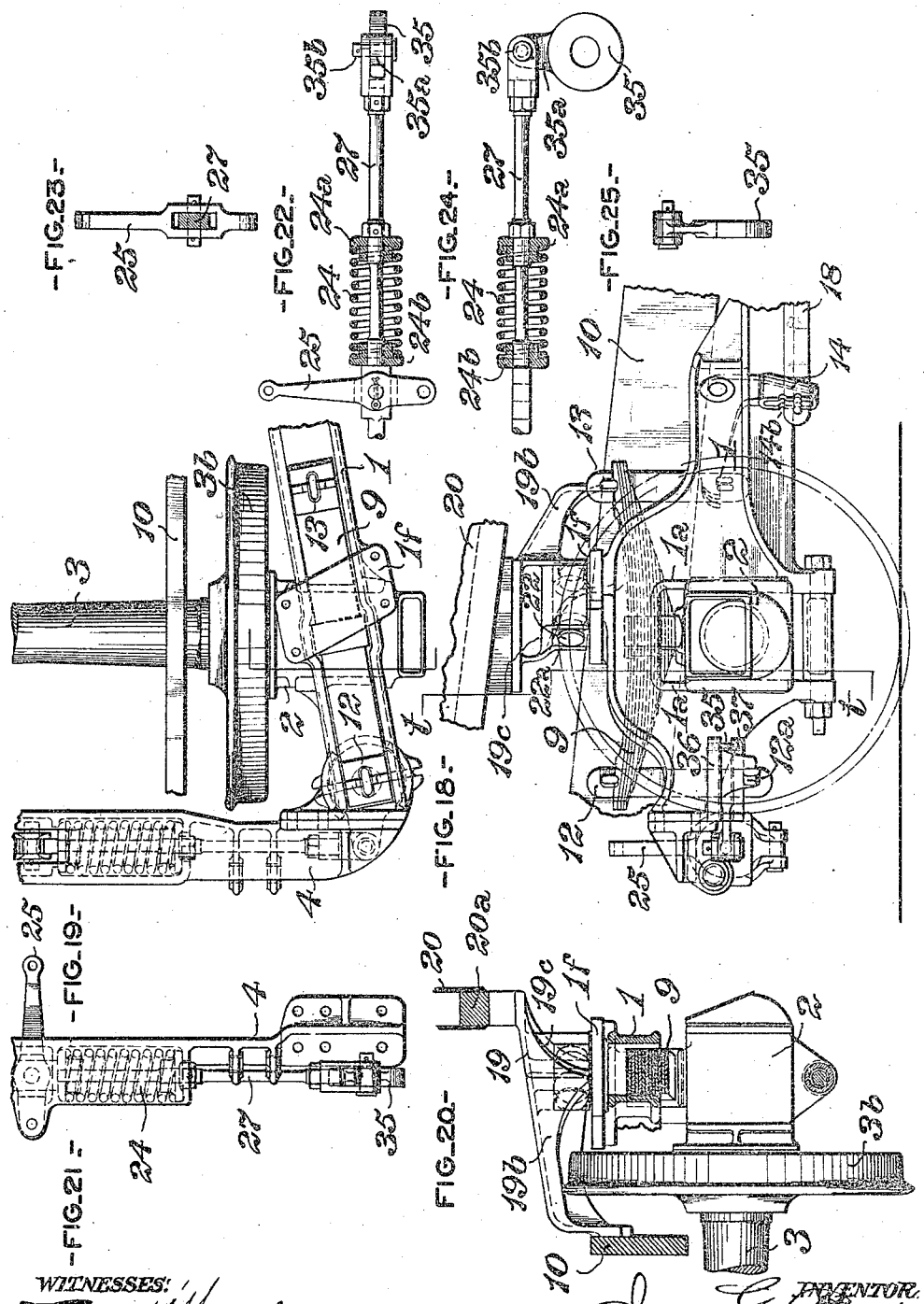

UNITED STATES PATENT OFFICE.

JAMES G. BLUNT, OF SCHENECTADY, NEW YORK.

LOCOMOTIVE TRAILING TRUCK.

1,133,437.

Specification of Letters Patent.

Patented Mar. 30, 1915.

Application filed December 30, 1914. Serial No. 879,679.

*To all whom it may concern:*

Be it known that I, JAMES G. BLUNT, of Schenectady, in the county of Schenectady and State of New York, have invented a certain new and useful Improvement in Locomotive Trailing Trucks, of which improvement the following is a specification.

My invention relates to outside journaled spring supported radial trailing trucks for locomotive engines, and its objects are: to provide simple and effective means for coupling the springs of a truck of such type with the driving axle spring equalizing system of the locomotive; to materially reduce the weight and cost of said means and parts related thereto; to effect the transmission of weight from the rear end of the locomotive boiler to the truck through a direct connection with the mud ring of the firebox, thereby reducing the stresses in the rear section of the main frame; to provide for utilizing the spring equalizing system as an aid to the centering of the truck; to provide a simple centering mechanism carried on the rear transverse member of the truck frame and coupled to the main frame of the locomotive and to a frictional resistance device; and to admit of the provision of ample ash pan clearance.

The improvement claimed is hereinafter fully set forth.

In the accompanying drawings: Figure 1 is a side view, in elevation, of a locomotive trailing truck illustrating an embodiment of my invention; Fig. 2, a plan view of the same; Fig. 3, a rear view, in elevation, and a vertical transverse section through one of the main frame side members and the superposed firebox mud ring, taken on the line *y y* of Fig. 1; Fig. 4, a vertical transverse section on the line *x x* of Fig. 2, looking forward; Fig. 5, a vertical section on the line *z z* of Fig. 2, Fig. 6, a vertical transverse section through the truck centering and friction device which is shown in Fig. 3, taken on the line *w w* of said figure; Fig. 7, a vertical longitudinal section, on the line *v v* of Fig. 6; Figs. 8, 9, 10 and 11, detail views of members of the centering and friction device; Fig. 12, a vertical transverse section through a rocker bearing and bracket interposed between the truck frame and the mud ring of the locomotive boiler firebox; Figs. 13, 14, 15, 16 and 17, detail views of members of the rocker bearing which is shown in Figs. 2, 3 and 4; Fig. 18, a side view, in elevation, of the rear portion of the truck, fitted with a modified form of friction device and boiler bearing; Fig. 19, a plan view of the same; Fig. 20, a vertical transverse section on the line *t t* of Fig. 18; Fig. 21, a rear view, in elevation, of the centering and friction device; Figs. 22, 23, 24 and 25, detail views of members of the centering and friction device which is shown in Figs. 18 and 19; Fig. 26, a plan view of the firebox supporting bracket; Fig. 27, a vertical transverse section through the same, on the line *s s* of Fig. 26; Fig. 28, a similar section, on the line *r r* of Fig. 26; Fig. 29, a similar section, on the line *q q* of Fig. 26; Fig. 30, a view, in elevation, of the roller of the support; and Figs. 31 and 32, detailed views of a guard which embraces the roller.

Referring to the drawings, my invention is herein exemplified as applied in a two wheeled radial locomotive trailing truck, the frame of which is substantially triangular in plan and comprises two pedestal sections, 1, 1, each forming one side of the frame, and a transverse rear frame section, 4, which is formed integral with, or connected to, their rear ends. The forward portions of the pedestal sections are inclined inwardly, that is, toward the longitudinal central plane of the locomotive, and their forward ends are connected, in said plane, either by forming the sections integral or by securing them together, these constructions being equivalents and ordinary practice, and the pedestal sections are provided, near their rear ends, with vertical pedestal jaws, 1ª, between which are fitted the journal boxes, 2, in which the journals of the truck axle, 3, rotate, said journals being located on the outer sides of the wheels, 3ᵇ, of said axle. The weight borne by the truck axle is transmitted to the journal boxes thereof through springs, 9, bearing on their tops. A center pin eye socket, 6, is formed on or secured to the forward end of the truck frame, which is pivoted to the main frame, 10, of the locomotive, by a pin, 7, passing through the socket, 6, and through jaws, 8ª, on a cross tie, 8, secured at its ends to the side members of the main frame.

As shown in plan at the top of Fig. 2, and in Fig. 19, the portions of the pedestal sections, 1, in which the pedestals are formed, and also the truck springs, 9, are inclined relatively to the rear truck frame section, 4, and the outer side of the wheels, 3ᵇ, the object of which inclined disposition is to avoid an excessive angle between the forward portions of the pedestal sections and the portions thereof in which the pedestals are formed, thereby insuring greater strength for a given weight of metal. A similar avoidance of excessive angularity in coupling the truck springs to the driving box springs is also effected. This inclination of the rear portion of the pedestal sections is not, however, essential, and they may, if preferred, be disposed at right angles to the rear frame section and parallel with the outer sides of the truck wheels, as shown at the bottom of Fig. 2. The transmission of weight between the springs, 11, of the rear driving wheels, 11ᵃ, and the truck springs, 9, is effected by means of a novel improved equalizing system, the construction of which will now be described. The rear ends of the truck springs, 9, are coupled to the pedestal sections of the truck frame by spring hangers, 12, and their forward ends are coupled, by spring hangers, 13, to the upper horizontally disposed and rearwardly extending arms of bell cranks, 14, which are journaled on horizontal pivot bearings, 14ᵃ, fitted in housings, 1ᵃ, formed on the pedestal sections adjacent to the forward pedestal jaws, 1ᵃ, thereof, and inclined relatively to the longitudinal central plane of the locomotive. Two bell cranks, 15, are journaled on horizontal pivot bearings, 15ᵃ, which are fitted in lugs on the lower side of the main frame cross tie, 8, and are inclined similarly to the pivot bearing, 14ᵃ, and the horizontally disposed and forwardly extending arms of the bell cranks, 15, are coupled to the springs, 11, of the rear driving wheels, by vertical links, 16, and a cross equalizer, 17, the ends of which are connected to the rear spring hangers, 11ᵇ, of the springs, 11. The downwardly extending arms of the bell cranks, 15, are coupled to the corresponding arms of the bell cranks, 14, by floating links, 18, which may be adjusted in notches, 14ᵇ and 15ᵇ, in the lower arms of the bell cranks, 14 and 15, so as to give greater or less leverage as desired, thereby increasing or decreasing the load borne by the truck springs.

As will be seen by reference to Fig. 2, the floating links, 18, extend forwardly and inwardly from the lower ends of the bell cranks, 14, and their forward ends are disposed on opposite sides of, and at equal determined distances from the axis of the center pin, 7. It follows from the construction and disposition of the members of the equalizing system, as above described, that when the truck swings in either direction, the lower arm of the bell crank on the following, or opposite, side of the truck, will approach the adjacent journal box, 2, thereby causing an upward movement of the front end of the corresponding truck spring, 9, and a proportionate reduction of the pressure thereof on the journal box. The duplicate disposition of the bell cranks and floating link on the other, or leading, side of the truck will effect a corresponding increase of spring pressure, by reason of the movements of the corresponding members being reversed.

The novel and characteristic feature of my invention above described, produces a desired increase of load upon the truck wheel which runs on the outer rail of a curve, and a reduction of load on the inside or opposite truck wheel, thereby inducing the locomotive to incline toward the inner rail of a curve and thereby promoting greater ease and safety in traversing the curve, particularly when running at high speed. This feature, further, provides a retardation of the lateral swing of the truck, which can be made greater or less, by changing the distance between the center pin, 7, and the front connections of the floating links, 18, the angle, leverage, and location of which may be varied in accordance with service requirements, without departure from the spirit and operative principle of my invention.

The equalizing system as above described, is much stronger and lighter, for given weight upon the truck and driving wheels, than that of well known devices heretofore applied for the same purpose. The truck can be manufactured economically in lots, as a complete unit, and in connecting it to the main frame of the locomotive, it is only necessary to insert and couple the floating links in such manner as to give the desired leverage, which operation involves considerably less work than that of connecting up the older types of massive equalizer levers.

The portion of the weight of the locomotive which is borne by the trailing truck, is, under my invention, preferably transmitted to the truck from the locomotive boiler through two bearing brackets, 19, one of which is attached to each side of the firebox, 20, of the boiler by being secured to the bottom of the mud ring, 20ᵃ, thereof, by bolts, 19ᵃ. A lateral extension, 19ᵇ, projects inwardly and downwardly from each of the brackets, 19, and is secured at its lower end, to the adjacent main frame member, 10. The brackets, 19, are preferably located above the pedestals of the truck at points about midway between the pivotal bearings of the rear spring hangers and those of the rear bell cranks, 14, for the purpose of approximately equalizing the stresses transmitted from the brackets to the truck frame, which transmission is, in Figs. 1 and 12, shown as effected through segmental rockers, 21, upon the curved upper faces of which the brackets are supported, and which are connected to the tops of saddles, 21ª, which straddle the pedestal sections, 1, of the frame, and are coupled, at their lower ends, thereto, by pins, 21ᵇ.

Instead of supporting the brackets, 19, upon segmental rockers, as above described, the support may be advantageously provided by the substitution of rollers, 22, (Figs. 18, 26, 27, 28, 29 and 30), which fit in bearings, 22ª, in the brackets and are embraced by rectangular roller dust guards, 23, which are slidingly supported on flat horizontal surfaces, 1ᶠ, on the tops of the pedestals. The rollers are consequently also supported by these surfaces, which are continually freed from grit or cinders by the scraping action of the roller guards, 23. Said guards, with the rollers and bearings, are removably fitted in housings, 19ᶜ, on the lower sides of the brackets, 19. The rollers are disposed radially to the center pin, to avoid sliding action upon the flat bearing surfaces, 1ᶠ.

A rectangular housing or frame, 4ª, is formed on the transverse rear frame section, 4, extending throughout its middle portion, for the reception of an adjustable truck centering device, which is of the following construction: Two longitudinally disposed coiled compression springs, 24, are fitted between the sides of the housing, 4ª, the end walls of which form stops, 4ᵇ, for outer spring seats, 24ª, against which the outer ends of the springs, 24, abut. A vertical lever, 25, is interposed between the inner ends of the springs, 24, said lever being pivotally supported at its lower end on a pin, 26, which is, in turn, supported by a pair of lugs or brackets, projecting downwardly from the opposite sides of the housing in the longitudinal central plane of the truck. A spring bar, 27, extends centrally through the springs, 24, and through their seats and the end stops of the housing, and is threaded on its end portions, which are engaged by nuts, 27ª, bearing against the outer sides of the end stops, for the purpose of adjusting the tension of the springs. The middle portion of the bar, 27, is of enlarged rectangular section, in which there is formed a slot which surrounds the lever, 25, at a determined distance above its bearing pin, 26, and the shoulders at the ends of the enlarged portion of the bar abut against inner spring seats, 24ᵇ, against the opposite sides of which the inner ends of the springs, 24, abut. Said end shoulders also abut against inner stops, 4ᶜ, on the housing. The upper end of the lever, 25, is coupled, by a floating link, 28, to one of the side members of the locomotive frame, 10.

The springs, 24, are, before being inserted in the housing, given a determined degree of initial compression by the adjustment of nuts, 27ª, on the bar, 27, in order to impart any desired initial resistance to lateral movement, or swing, of the truck, which swing causes a corresponding swing of the lever, 25, about its bearing pin, 26, against the resistance of the springs, 24, through their connection with the lever by the bar, 27, and spring seats, 24ª and 24ᵇ. In the swinging of the truck toward the right side of the locomotive, the lever, 25, is inclined toward the left, causing the left hand spring to be compressed against the corresponding end stop, 4ᵇ, of the housing, and the right hand spring to be compressed against the corresponding inner end stop, 4ᶜ. When the truck swings to the left, the lever, 25, is inclined toward the right, and its movement is retarded by both springs as before, except that they are compressed toward the right. The upper arm of the lever, 25, is preferably made of greater length than the vertical distance between the axes of the spring bar, 27, and the bearing pivot, 26, in order to provide a more nearly constant resistance to the lateral swing of the truck, and to reduce the spring compression for a given degree of swing of the truck, thereby prolonging the life of the springs and effecting a better resilient action.

Under certain conditions of operation, it becomes important to steady the swing of the truck by a frictional resistance device, a suitable form of which, as more particularly illustrated in Figs. 1, 3, 6 and 7, is of the following construction: A longitudinally movable sliding plate, 29, is interposed horizontally between a friction plate, 30, and a pressure cover, 31, which are connected to the rear frame member, 4, of the truck, by bolts, 31ª. Said bolts support, on their lower ends, a spring seat, 32, between the top of which and the bottom of the frame section, 4, there is interposed a spring, 33, which exerts a downward thrust upon the spring seat, 32, which thrust is transmitted to the pressure cover, 31, by the bolts, 31ª, and is rendered adjustable in degree, by the nuts, 31ᵇ, which engage the lower ends of said bolts. A determined frictional resistance to longitudinal movement of the sliding plate, 29, is thereby exerted, in the resultant clamping of said plate between the cover plate, 31, and the friction plate, 30. The friction plate, is provided with a centrally disposed slot, which engages a roller, 34, pivotally mounted on the vertical lever, 25, of the centering mechanism before described, thereby causing the angular movement of the lever to be transmitted to the sliding plate, and to be retarded by the frictional resistance to the movement of the latter, to a desired and determined degree.

Figs. 18, 19 and 21 to 25 inclusive, illustrate a structural modification of the frictional resistance device above described, in which the spring, 33, is dispensed with, and the pressure by which resistance is imposed is derived from the springs, 9, of the truck wheels, and transmitted therefrom to the lever, 24, of the centering mechanism, through the rear spring hangers, 12. Rotatable circular sliding plates, 35, each having an arm, 35ª, projecting from its periphery, are fitted in circular recesses formed in the lower sides of friction plates, 36, formed on the rear ends of the pedestal sections, 1, 1, of the truck frame, and pressure covers, 37, are fitted against the lower sides of the sliding plates, 35. The plates, 35 and 36, and cover, 37, are centrally perforated, and the rear spring hangers, 12, pass through their perforations, and maintain them in contact by keys, 12ª, which pass through the spring hangers and abut against the lower ends of the pressure covers, 37. The arms, 35ª, of the rotatable sliding plates, are pivotally coupled to the ends of the spring bar, 27, of the centering mechanism, by pins, 35ᵇ, and the spring bar is connected with the vertical lever, 25, and compression springs, 24, of the centering mechanism, as in the construction shown in Figs. 3, 6, and 7, and hereinbefore described. It will be seen that upward pressure exerted by the truck springs on the hangers, 12, will clamp the sliding plates, 35, between the friction plate, 36, and pressure covers, 37, and thereby oppose frictional resistance to movement of the sliding plates about their axes, and consequently to longitudinal movement of the connected spring bar, 27, in the swinging of the truck in either direction.

I claim as my invention and desire to secure by Letters Patent:—

1. In a locomotive engine, the combination of a main frame, a radial truck pivoted thereto, and an equalizing system interposed between the supporting wheels of the main and truck frames and comprising connected bell cranks journaled on the truck frame, and subjected, respectively, to the weight on the supporting wheels of the main frame and of the truck frame.

2. In a locomotive engine, the combination of a main frame, a radial truck pivoted thereto, and an equalizing system interposed between the supporting wheels of the main and truck frames and comprising connected bell cranks journaled on the truck frame and subjected, respectively, to the weight on the supporting wheels of the main frame, applied in advance and on opposite sides of the pivot of the truck, and to the weight on the truck wheels, applied adjacent thereto.

3. In a locomotive engine, the combination of a main frame, driving wheels journaled in bearings therein, a radial truck pivoted to the main frame, truck wheels journaled in bearings therein, springs transmitting weight from the main frame to the driving wheels, springs transmitting weight from the frame of the truck to its wheels, a pair of bell cranks journaled on the truck frame and coupled to the truck springs, a pair of bell cranks journaled on said frame and coupled to the driving wheel springs, and links connecting one bell crank of each pair to the adjacent bell crank of the other pair.

4. In a locomotive engine, the combination of a main frame, driving wheels journaled in bearings therein, a radial truck pivoted to the main frame, truck wheels journaled in bearings therein, springs transmitting weight from the main frame to the driving wheels, springs transmitting weight from the frame of the truck to its wheels, a pair of bell cranks journaled on the truck frame and coupled to the truck springs, a pair of bell cranks journaled on said frame and coupled to the driving wheel springs, links connecting one bell crank of each pair to the adjacent bell crank of the other pair, and means for varying the leverage of the bell cranks by adjustment of said links thereon.

5. In a locomotive engine, the combination of a main frame, driving wheels journaled in bearings therein, a boiler supported on the main frame and having its firebox back of the rear driving wheels, a radial truck pivoted to the main frame, brackets secured to the mud ring of the firebox, bearings on the truck frame, and cylindrical members through which weight is transmitted from said brackets to said bearings.

6. In a locomotive engine, the combination of a main frame, driving wheels journaled in bearings therein, a boiler supported on the main frame and having its firebox back of the rear driving wheels, a radial truck pivoted to the main frame, brackets secured to the mud ring of the firebox, bearings on the truck frame, and rollers interposed between said brackets and said bearings.

7. In a locomotive engine, the combination of a main frame, driving wheels journaled in bearings therein, a boiler supported on the main frame and having its firebox back of the rear driving wheels, a radial truck pivoted to the main frame, brackets secured to the mud ring of the firebox, bearings on the truck frame, and rollers journaled in said brackets and traversing on said bearings.

8. In a locomotive engine, the combination of a main frame, driving wheels journaled in bearings therein, a boiler supported on the main frame and having its firebox back of the rear driving wheels, a radial truck pivoted to the main frame, brackets secured to the mud ring of the firebox, bearings on the truck frame, and rollers journaled in said brackets, with their axes at angles to the truck frame members, and traversing on said bearings.

9. In a locomotive engine, the combination of a main frame, driving wheels journaled in bearings therein, a boiler supported on the main frame and having its firebox back of the rear driving wheels, a radial truck pivoted to the main frame, brackets secured to the mud ring of the firebox, bearings on the truck frame members, and traversing brackets and traversing on said bearings, and rectangular dust guards embracing said rollers and sliding on said bearings.

10. In a locomotive engine, the combination of a main frame, a radial truck pivoted thereto and having a frame comprising a transverse rear section and two side sections extending forwardly therefrom, a centering mechanism mounted on the rear frame section, a lever pivoted to said centering mechanism, and a link coupling said lever to the main frame.

11. In a locomotive engine, the combination of a main frame, a radial truck pivoted thereto and having a frame comprising a transverse rear section and two side sections extending forwardly therefrom, a centering mechanism mounted on the rear frame section, connections pivotally coupling said centering mechanism to the main frame, and a frictional resistance device connected to said centering mechanism.

12. In a locomotive engine, the combination of a main frame, a radial truck pivoted thereto and having a frame comprising a transverse rear section and two side sections extending forwardly therefrom, a centering mechanism mounted on the rear frame section, connections pivotally coupling said centering mechanism to the main frame, and a frictional resistance device comprising a movable friction plate coupled to the centering mechanism, and stationary friction plates bearing on said movable friction plate and connected to the truck frame.

13. In a locomotive engine, the combination of a main frame, a radial truck pivoted thereto and having a frame comprising a transverse rear section and two side sections extending forwardly therefrom, two compression springs abutting against stops on the rear frame section, a spring bar extending through said springs, and bearing on their outer ends, a lever pivoted to the rear frame section, below said springs and intermediate of their inner ends, and extending through a slot in the spring bar, and a link coupling said lever to the main frame.

14. In a locomotive engine, the combination of a main frame, a radial truck pivoted thereto and having a frame comprising a transverse rear section and two side sections extending forwardly therefrom, two compression springs abutting against stops on the rear frame section, a spring bar extending through said springs and bearing on their outer ends, adjusting nuts engaging threads on the ends of said spring bar, a lever pivoted to the rear frame section, below said springs and intermediate of their inner ends, and extending through a slot in the spring bar, and a link coupling said lever to the main frame.

15. In a locomotive engine, the combination of a main frame, a radial truck pivoted thereto and having a frame comprising a transverse rear section and two side sections extending forwardly therefrom, two compression springs abutting against stops on the rear frame section, a spring bar extending through said springs and bearing on their outer ends, a lever pivoted to the rear frame section below said springs and intermediate of their inner ends, and extending through a slot in the spring bar, a link coupling said lever to the main frame, and a frictional resistance device mounted on the truck frame and coupled to the spring bar.

16. In a locomotive engine, the combination of a main frame, a radial truck pivoted thereto, a centering mechanism mounted on the frame of said truck, a frictional resistance device connected to said centering mechanism, and means for applying spring pressure to said frictional resistance device.

17. In a locomotive engine, the combination of a main frame, a radial truck pivoted thereto, springs through which weight is transmitted from the frame of the truck to the wheels and axle thereof, a centering mechanism mounted on the frame of said truck, a frictional resistance device connected to said centering mechanism, and means for applying pressure from the truck springs to said frictional resistance device.

18. In a locomotive engine, the combination of a main frame, a radial truck pivoted thereto, springs through which weight is transmitted from the frame of the truck to the wheels and axle thereof, friction plates fixed on the truck frame, rotatable sliding plates fitting against said friction plates, pressure covers fitting against said sliding plates, a centering mechanism mounted on the frame of the truck and coupled to said sliding plates, and spring hangers passing freely through said friction plates, sliding plates, and pressure covers, and bearing on the truck springs and on said pressure covers.

JAMES G. BLUNT.

Witnesses:
ROBERT F. HALL,
CHARLES W. TODD.